United States Patent Office 2,967,201
Patented Jan. 3, 1961

2,967,201

ALKYLAMINOALKYL ETHERS OF PHENOLS

Quentin F. Soper, Indianapolis, Ind., assignor to Eli Lilly and Company, Indianapolis, Ind., a corporation of Indiana No Drawing. Filed June 2, 1958, Ser. No. 738,968

4 Claims. (Cl. 260—570.7)

This invention relates to novel monoalkylaminoalkyl ethers of substituted phenols.

The compounds provided by this invention can be represented by the following formula:

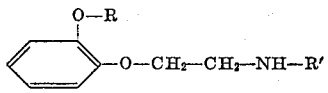

wherein R is ethyl or methyl, and R' is an alkyl group containing 4 or 5 carbon atoms. Radicals exemplary of R' are the isoamyl radical, the n-butyl radical, the sec-butyl radical, the n-amyl radical, the sec-amyl radical, the isobutyl radical, and the like.

Also included within the scope of this invention are the nontoxic, pharmaceutically-acceptable acid addition salts of the above amine bases. Suitable salts include those formed from nontoxic, pharmaceutically-acceptable acids such as hydrochloric acid, phosphoric acid, hydrobromic acid, sulfuric acid, maleic acid, succinic acid, benzoic acid, and the like.

Illustrative of the compounds provided by this invention are the following: N-sec-butyl-2-(o-ethoxyphenoxy)-ethylamine hydrobromide, N-isoamyl-2-(o-ethoxyphenoxy)-ethylamine tartrate, N-(2-methylbutyl)-2-(o-methoxyphenoxy)-ethylamine, N-isobutyl-2-(o-methoxyphenoxy)-ethylamine maleate, and the like.

In general, the amine bases of this invention are high boiling viscous oils whereas their nontoxic pharmaceutically-acceptable acid addition salts are white crystalline solids. The amine bases are prepared by reacting directly a 2-(o-alkoxy-phenoxy)-ethyl halide, e.g., a bromide or chloride, with a butylamine or an amylamine. The reaction product, which is the hydro-halide salt of the amine, is treated with alkali to liberate the amine base which is then purified as by distillation in vacuo. Alternatively, an o-alkoxyphenoxyacetyl halide or o-alkoxyphenoxyacetic anhydride is reacted with a butylamine or an amylamine to yield the corresponding amide which is then reduced, as with lithium aluminum hydride, to the desired N-[2-(o-alkoxyphenoxy)-ethyl]-amyl or butylamine.

An acid addition salt of a particular amine base is prepared by any of the customary methods of the art, for example, by adding the desired acid to a solution of the base and isolating the amine salt by filtration or by evaporation of the solution to dryness. When a non-volatile acid is used for salt formation, it is customary to employ equimolar quantities of the acid and base.

The amine bases and their pharmaceutically-acceptable acid addition salts as provided by this invention have a central depressant action which makes them useful in the treatment of animals as tranquilizing, anti-emetic and hypotensive agents. For these purposes, the compounds can be administered in customary dosage forms, such as tablets, filled capsules, suspensions and solutions, any of which are prepared in accordance with the usual practices of the pharmaceutical art.

This invention is further illustrated by the following specific examples.

EXAMPLE 1

*Preparation of N-n-butyl-2-(o-methoxyphenoxy)-ethylamine*

225.6 g. of 2-(o-methoxyphenoxy)-ethyl bromide were added to 292 g. of n-butylamine at a rate such as to maintain the reaction mixture at refluxing temperature. After the addition had been completed, the mixture was stirred and heated at about 100° C. for 16 hours. The reaction mixture was then evaporated in vacuo leaving a solid residue comprising N-n-butyl-2-(o-methoxyphenoxy)-ethylamine hydrobromide. The solid residue was dissolved in about 500 ml. of water, and the solution was made strongly basic with 50 percent (w./v.) sodium hydroxide solution. N-n-butyl-2-(o-methoxyphenoxy)-ethylamine separated as an oil, and was extracted into about 500 ml. of ether. The ether extract was separated, was dried, and was distilled. N-n-butyl-2-(o-methoxyphenoxy)-ethylamine boiled at about 120–123° C. at a pressure of about 0.2 mm. of mercury; $n_D^{25}=1.509$.

The amine base was dissolved in about 3 l. of anhydrous ether and the solution was saturated with anhydrous hydrogen chloride gas, thus precipitating N-n-butyl-2-(o-methoxyphenoxy)-ethylamine hydrochloride. The precipitate was separated by filtration and was recrystallized twice from an ethanol-ether solvent mixture. The purified N-n-butyl-2-(o-methoxyphenoxy)-ethylamine hydrochloride melted at about 145–146° C.

*Analysis.*—Calculated: C, 60.10; H, 8.54; N, 5.39. Found: C, 60.31; H, 8.61; N, 5.68.

EXAMPLE 2

*Preparation of N-isobutyl-2-(o-methoxyphenoxy)-ethylamine*

The procedure of Example 1 was followed except that instead of n-butylamine, isobutylamine was reacted with 2-(o-methoxyphenoxy)-ethyl bromide. N-isobutyl-2-(o-methoxyphenoxy)-ethylamine thus prepared was purified by distillation. It boiled at about 90–100° C. at a pressure of 0.05 mm. of mercury; $n_D^{25}=1.505$.

N-isobutyl-2-(o-methoxyphenoxy)-ethylamine hydrochloride was prepared from the amine base by the method of Example 1. It melted at about 143–145° C. after recrystallization from an ethanol-ether solvent mixture.

*Analysis.*—Calculated: C, 60.10; H, 8.54. Found: C, 60.12; H, 8.28.

EXAMPLE 3

*Preparation of N-sec-butyl-2-(o-methoxyphenoxy)-ethylamine*

23.1 g. of 2-(o-methoxyphenoxy)-ethyl bromide were added to 29.6 g. of sec-butylamine at a rate sufficient to maintain refluxing of the reaction mixture. After the addition had been completed the mixture was heated at 100° C. for about 10 hours. N-sec-butyl-2-(o-methoxyphenoxy)-ethylamine thus formed was isolated and purified by the procedure described in Example 1. It boiled at about 103–105° C. at a pressure of about 0.05 mm. of mercury; $n_D^{25}=1.506$.

N-sec-butyl-2-(o-methoxyphenoxy)-ethylamine hydrochloride was prepared in ether solution by the addition of anhydrous hydrogen chloride. The insoluble hydrochloride salt which precipitated was filtered off, and was recrystallized from an ethanol-ether solvent mixture. The purified salt melted at about 105–108° C.

*Analysis.*—Calculated: C, 60.10; H, 8.54. Found: C, 59.89; H, 8.74.

EXAMPLE 4

*Preparation of N-n-amyl-2-(o-methoxyphenoxy)-ethylamine*

18.6 g. of 2-(o-methoxyphenoxy)-ethyl bromide was reacted with 18.3 g. of n-amylamine by the procedure described in Example 1 to produce N-n-amyl-2-(o-methoxyphenoxy)-ethylamine hydrobromide. The hydrobromide salt was converted to the free amine base by dissolving the salt in water and making the solution strongly basic with 50 percent (w./v.) sodium hydroxide. The free amine base which separated was extracted into ether. The ether layer was separated and was evaporated in vacuo leaving N-n-amyl-2-(o-methoxyphenoxy)-ethylamine as an oily residue.

N-n-amyl-2-(o - methoxyphenoxy) - ethylamine hydrochloride was prepared by dissolving the oily amine base in chloroform, saturating the solution with anhydrous hydrogen chloride gas and adding ether to precipitate the hydrochloride salt of the amine. The hydrochloride salt was filtered and was recrystallized from an anhydrous ethanol-ether solvent mixture. Purified N - n - amyl - 2- (o-methoxyphenoxy)-ethylamine hydrochloride melted at about 79–80° C.

*Analysis.*—Calculated: N, 5.11; Cl, 12.95. Found: N, 4.83; Cl, 12.74.

EXAMPLE 5

*Preparation of N-n-butyl-2-(o-ethoxyphenoxy)-ethylamine*

A solution of 36 g. of sodium hydroxide in 60 ml. of water was added dropwise to a mixture of 138 g. of o-ethoxyphenol and 375 g. of ethylene dibromide. After the addition had been completed, the reaction mixture was heated at refluxing temperature with stirring for about 16 hours. The reaction mixture was cooled, and the organic layer which separated was dried and was distilled. The fraction boiling at about 140–142° C. at a pressure of about 10 mm. of mercury was collected and comprised o-ethoxyphenoxyethyl bromide.

24.5 g. of o-ethoxyphenoxyethyl bromide was heated with 22 g. of n-butylamine at about 150° C. for about 16 hours. The reaction mixture containing N-n-butyl-2-(o-ethoxyphenoxy)-ethylamine hydrobromide formed in the above reaction was poured into 100 ml. of 10 percent aqueous hydrochloric acid. The acidic aqueous solution was extracted with 200 ml. of ether, and the ether layer was separated and was discarded. The acidic aqueous layer was then made basic with excess 10 percent aqueous sodium hydroxide. N - n - butyl-2-(o-methoxyphenoxy)-ethylamine separated, and was extracted into 200 ml. of ether. The ether layer was separated, was dried, and the ether was evaporated in vacuo. The residue comprising N-n-butyl-2-(o-ethoxyphenoxy)-ethylamine was distilled. The fraction boiling in the range 164–167° C. at a pressure of about 8 mm. of mercury was collected and was purified N-n-butyl-2-(o-ethoxyphenoxy)-ethylamine.

*Analysis.*—Calculated: C, 70.85; H, 9.77; N, 5.90. Found: C, 71.06; H, 9.77; N, 5.80.

N-n-butyl - 2 - (o - ethoxyphenoxy) - ethylamine hydrochloride was prepared from the free base by the method of Example 1. It melted at about 127–129° C. after recrystallization from an ether-ethanol solvent mixture.

*Analysis.*—Calculated: C, 61.39; H, 8.84; N, 5.11. Found: C, 61.04; H, 8.80; N, 4.95.

I claim:

1. A compound selected from the class consisting of an amine base and its nontoxic, pharmaceutically-acceptable acid addition salts, said amine base being represented by the following formula:

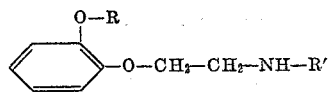

wherein R is a radical selected from the group consisting of ethyl and methyl and R' is a straight chain alkyl radical having from 4 to 5 carbon atoms.

2. N-n-butyl-2-(o-methoxyphenoxy)-ethylamine.
3. N-n-amyl-2-(o-methoxyphenoxy)-ethylamine.
4. N-n-butyl-2-(o-ethoxyphenoxy)-ethylamine.

References Cited in the file of this patent

UNITED STATES PATENTS

| | | |
|---|---|---|
| 1,787,519 | Hahl | Jan. 6, 1931 |
| 2,765,338 | Suter et al. | Oct. 2, 1956 |
| 2,773,899 | Martin et al. | Dec. 11, 1956 |

FOREIGN PATENTS

| | | |
|---|---|---|
| 300,695 | Great Britain | Nov. 19, 1928 |
| 687,189 | Great Britain | Feb. 11, 1953 |
| 292,589 | Switzerland | Nov. 2, 1953 |
| 298,410 | Switzerland | July 1, 1954 |

OTHER REFERENCES

Suter et al.: Justus Liebig's Annalen, vol. 576, pages 218 and 221 (1952).